May 14, 1963 R. L. HUSTEAD 3,089,355
CENTER CRANK FEED DRILL PRESS
Filed Nov. 29, 1960
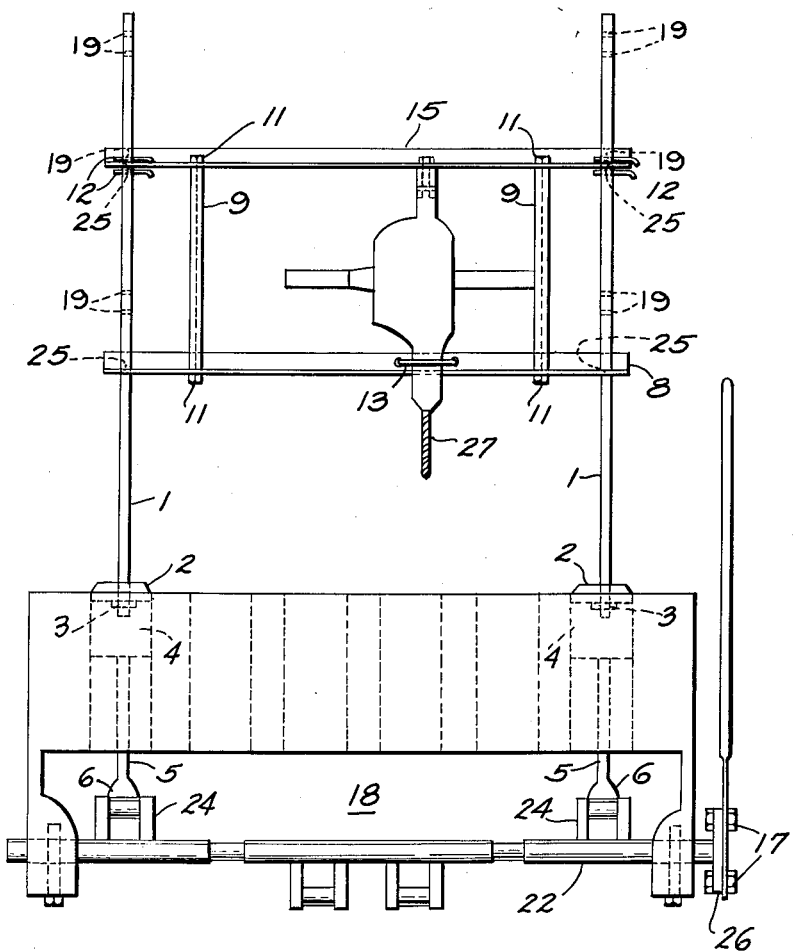
INVENTOR
RALPH L. HUSTEAD United States Patent Office 3,089,355
Patented May 14, 1963

3,089,355
CENTER CRANK FEED DRILL PRESS
Ralph L. Hustead, 433 N. Van Buren, General Delivery, Chicago, Ill.
Filed Nov. 29, 1960, Ser. No. 72,458
1 Claim. (Cl. 77—6)

The object of this invention is to make use of a used motor block with the assembly of two connecting rods and pistons attached to equal crank throws, and using this assembly to attach a drill press stand to top of pistons. The reciprocating action necessary to feed drill through the work is accomplished by a feed lever attached to fly wheel flange.

Another object of this invention is to provide a drill press for portable electric drills that is economical, will receive any size work either as to height or width, and by increasing the size of motor block and material used in drill press will accommodate the largest of portable electric drills.

Another object is to provide a drill press that can be made into a multiple drilling, drill press by the arrangement of the drilling units in parallel position and coupling feed levers.

Another object is to provide a drill press that will give a continuous drilling operation, by power feed in one direction.

Another object is to provide a drill press that can be easily dismantled and shipped in a compact bundle.

These objects are accomplished by a new design that is very useful to all shops large or small or for manufacturing, and also the rugged simplicity gives this portable unit new uses for the job work.

The drawing is a side view of the drill press with a portable electric drill in place, and with the drill press in a raised position.

*Detailed Description*

The drawing shows a construction of a motor block with two connecting rod assemblies and pistons with the drill press stand attached to tops of wither pistons. The example of this construction will now be described in detail:

The motor block 18 is the base of the drill press which houses the assembly of crank shaft 22, connecting rods 5 and pistons 4. Now this assembly is the only moving parts of the drill press which is all below the work surface of the top of the motor block. Fly wheel flange 26 has a feed lever 16 attached by two bolts 17, this feed lever 16 when moved forward brings into action the crank throws 24 which move connecting rods 5 attached to crank throw 17 by a bearing insert 6. The tops of connecting rods have pistons 4 attached which receive uprights 1 through a hole in center piston 4. This upright is secured by nuts 2 and 3.

The lever arm 16 is a fulcrum attached at flywheel flange 26 giving the necessary distance from the center of crank throw. This fulcrum provides necessary force to give the reciprocation action to the drill press stand with a portable electric drill in place to force the cutting tool through work. The work is mounted on top of motor block 18.

The pistons 4 which hold drill press stand have a large stabilizing area of their sides to cylinder walls of motor block. This large guiding surface gives extreme accuracy in drilling holes true at right angles. The pistons hold the drill press stand rigid preventing turning as drilling operations proceed, also they are spaced to give large throat clearance from point of drill to upright.

This throat distance can be increased to any desired distance simply by using two motor blocks attached, flywheel flange to flywheel flange coupled by the necessary spacer of needed length. Angle frame members 7 and 7 will be of needed length and strength to reach from one motor block to another. The connecting rod and piston assembly attached to crank throws of similar positions.

Cross frame members 7 and 8 are held together by bolts 9 with nuts 11 on either end. U bolt 13 holds neck of drill in place and extends through, two holes drilled in angle member 8. Companion pin 15 at the top of drill passes through the top angle member 7 and the handle of drill, holding handle of drill in place. This assembly is known as the drill frame.

The drill frame is adjustable as to height to provide distance needed for extra large work to bring point of drill 27 to additional height needed away from top of block.

Holes 19 are drilled in uprights 1 to receive cotter pins 12 which hold drill frame in desired position. These cotter pins are easily removable to adjust the drill frame to different heights. The clearance holes 25 are drilled in either end of angles 7 and 8 to permit easy vertical moving of drill frame for work adjustment.

The drill press stand is so constructed to permit easy dismantling and will package in a neat bundle for shipping.

The drill press stand is a solid built one piece construction so has no wearing places and attached to top of pistons by a solid fit.

This close fit bearing based feed linkage gives an accurate non-wearing depth drilling accuracy.

A continuous drilling operation can be had by attaching a sprocket on flywheel flange 26 and turning in one direction by a motor. This gives a continuous feeding and lifting action necessary for repeated drilling. Power fed material can be automatically drilled in this manner.

According to the provisions of the patent statutes, I have explained the principle of my invention and have illustrated and described what I now consider to represent its best embodiment. However, I desire to have it understood that, within the scope of the appended claim, the invention may be practiced otherwise than as specifically illustrated and described.

I claim:

In a drill press for supporting a portable drill, a motor block having at least two cylinders and a flat upper surface for supporting a workpiece, a crankshaft mounted in said motor block below the cylinders, a crank fastened to one end of the crankshaft for rotating said crankshaft, pistons slideable in said cylinders and attached to said crankshaft by connecting rods, a drill press stand fastened to said pistons including upright supports axially aligned with said cylinders and having a plurality of openings therein, two parallel spaced cross members for supporting a portable drill, means cooperating with said openings for selectively mounting said cross members on said supports, two spacer members parallel with said supports connecting said cross members, means for attaching the handle of a portable drill to one of said cross members, a U-shaped bolt in the other of said cross members for holding the neck of said portable drill, whereby when said crank is rotated the drill press stand reciprocates and feeds said drill relative to the work supported on the motor block.

References Cited in the file of this patent
UNITED STATES PATENTS

| | | |
|---|---|---|
| 966,217 | King | Aug. 2, 1910 |
| 1,241,543 | Murphy | Oct. 2, 1917 |
| 1,470,143 | Buterbaugh | Oct. 9, 1923 |
| 1,670,731 | Miller | May 22, 1928 |
| 2,622,457 | Buck | Dec. 23, 1952 |